United States Patent
Zuo et al.

(10) Patent No.: US 9,428,622 B1
(45) Date of Patent: *Aug. 30, 2016

(54) HYBRID LATEX VIA PHASE INVERSION EMULSIFICATION

(71) Applicant: XEROX CORPORATION, Norwalk, CT (US)

(72) Inventors: Yanjia Zuo, Rochester, NY (US); Shigeng Li, Penfield, NY (US); Chieh-Min Cheng, Rochester, NY (US); John L. Pawlak, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,871

(22) Filed: Apr. 24, 2015

(51) Int. Cl.
*C08J 3/11* (2006.01)
*C08J 3/20* (2006.01)
*C08L 51/08* (2006.01)
*C08L 25/14* (2006.01)
*C08L 33/08* (2006.01)
*C08L 67/00* (2006.01)

(52) U.S. Cl.
CPC . *C08J 3/203* (2013.01); *C08J 3/11* (2013.01); *C08J 2351/08* (2013.01); *C08J 2425/14* (2013.01); *C08J 2433/08* (2013.01); *C08L 25/14* (2013.01); *C08L 33/08* (2013.01); *C08L 51/08* (2013.01); *C08L 67/00* (2013.01)

(58) Field of Classification Search
CPC ........... C08J 3/11; C08L 51/08; C08L 67/00; C08L 25/14; C08L 33/08
See application file for complete search history.

(56) References Cited

U.S. PATENT DOCUMENTS

| | | | |
|---|---|---|---|
| 3,590,000 A | 6/1971 | Palermiti et al. | |
| 3,800,588 A | 4/1974 | Larson et al. | |
| 4,298,672 A | 11/1981 | Lu | |
| 4,338,390 A | 7/1982 | Lu | |
| 5,290,654 A | 3/1994 | Sacripante et al. | |
| 5,302,486 A | 4/1994 | Patel et al. | |
| 5,391,695 A | 2/1995 | Kawabe et al. | |
| 5,483,016 A | 1/1996 | Aoki et al. | |
| 5,908,727 A | 6/1999 | Kawaji et al. | |
| 6,063,827 A | 5/2000 | Sacripante et al. | |
| 6,214,507 B1 | 4/2001 | Sokol et al. | |
| 6,593,049 B1 | 7/2003 | Veregin et al. | |
| 6,756,176 B2 | 6/2004 | Stegamat et al. | |
| 6,830,860 B2 | 12/2004 | Sacripante et al. | |
| 6,984,601 B2 * | 1/2006 | Shirai ................ G03G 9/08755 502/150 |
| 7,205,357 B2 | 4/2007 | Kubo et al. | |
| 7,387,863 B2 | 6/2008 | Shirai et al. | |
| 8,609,313 B2 | 12/2013 | Eida et al. | |
| 8,921,021 B2 | 12/2014 | Fukuri et al. | |
| 9,280,075 B1 * | 3/2016 | Zuo .................... G03G 9/09364 |
| 2006/0222991 A1 | 10/2006 | Sacripante et al. | |
| 2009/0246680 A1 * | 10/2009 | Chung ........................ C08J 3/05 430/137.14 |
| 2010/0310979 A1 * | 12/2010 | Ou ........................ G03G 9/0804 430/108.2 |
| 2011/0223527 A1 * | 9/2011 | Iio ............................ G03G 8/00 430/105 |

* cited by examiner

*Primary Examiner* — Richard A Huhn
(74) *Attorney, Agent, or Firm* — Pillsbury Winthrop Shaw Pittman LLP

(57) ABSTRACT

A phase inversion emulsification process includes dissolving a polyester resin and a styrene/acrylate resin in an organic solvent to provide a solution, neutralizing the solution with a neutralizing agent, forming an emulsion by adding water after the neutralizing step and removing a portion of the organic solvent from the emulsion to provide a latex.

20 Claims, 1 Drawing Sheet

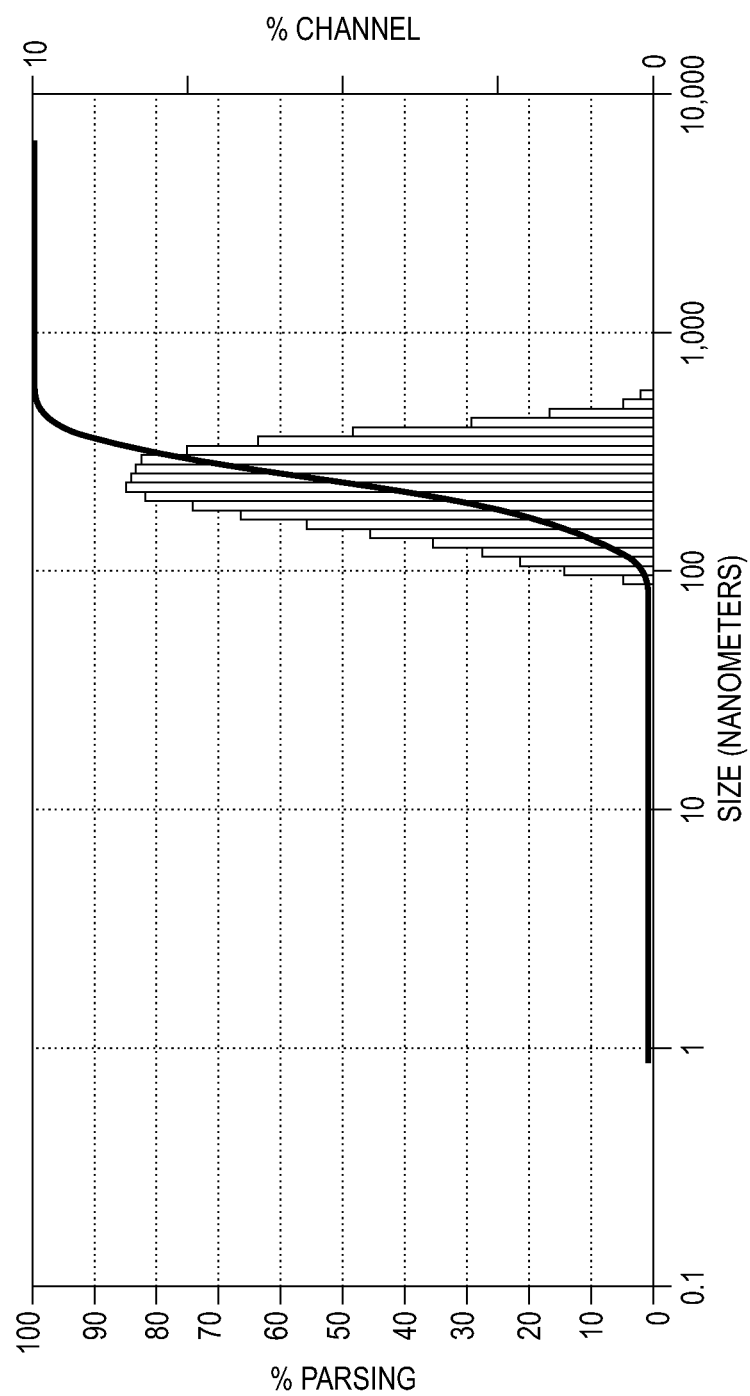

HYBRID LATEX VIA PHASE INVERSION EMULSIFICATION

BACKGROUND

The present disclosure relates to processes for producing hybrid resin emulsions useful in preparing toner particles. More specifically, the present disclosure provides efficient hybrid resin emulsion preparations via a phase inversion emulsification process.

The Phase Inversion Emulsification (PIE) process is a method whereby the phases of a liquid-solid dispersion interchange such that the dispersed phase spontaneously inverts to become the continuous phase and vice versa under conditions determined by the system properties, volume ratio and energy input.

The phase inversion process typically involves the solubilization of a resin and other components in an organic solvent or mixture of organic solvents that include a phase inversion organic solvent, which is typically chosen for its solubility in both organic and aqueous phases.

By way of example, a solvent-based phase inversion emulsification process is often used to form a polyester resin emulsion in the production of polyester-based toners. In the phase inversion emulsification process, the polyester resin is first dissolved in appropriate organic solvents, such as methyl ethyl ketone and isopropanol, to produce a homogenous organic phase, followed by addition of a fixed amount of base solution, such as ammonium hydroxide, to neutralize acid end carboxyl groups on the polyester chain. The neutralized polymer is subsequently converted to a uniform dispersion of polyester particles, or latex, in water by phase inversion.

While polyester-based emulsions are attractive for their lower melting temperatures, other commonly used resins, such as polystyrene-acrylates (having higher melting temperatures), are lower in cost. Efforts have focused on creating hybrid resins to take advantage of the lower melting polyester along with the lower cost styrene-acrylate system. Such attempts at hybrid resin preparation have been thwarted by complicated aggregation/coalesences (A/C) or continuous coalescence process adjustments in order to incorporate styrene-acrylate resins into polyester based toners, reducing the cost effectiveness of toner production.

SUMMARY

In some aspects, embodiments herein relate to phase inversion emulsification processes comprising dissolving a polyester resin and a styrene/acrylate resin in an organic solvent to provide a solution, neutralizing the solution with a neutralizing agent, forming an emulsion by adding water after the neutralizing step, and removing a portion of the organic solvent from the emulsion to provide a latex.

In some aspects, embodiments herein relate to process comprising dissolving a polyester resin and a styrene/acrylate resin in an organic solvent to provide a solution, neutralizing the solution with a neutralizing agent, forming an emulsion by adding water after the neutralizing step, removing a portion of the organic solvent from the emulsion to provide a latex, and mixing with sufficient heating the latex and one or more of a pigment, a wax, an aggregating agent, and a charge control agent to provide aggregated particles.

In some aspects, embodiments herein relate to processes comprising dissolving a styrene/butylacrylate resin and a copolymer of styrene/acrylate-polyester resin in a solvent mixture of methylethylketone (MEK) and isopropyl alcohol (IPA); to provide a solution, neutralizing the solution with a neutralizing agent, forming an emulsion by adding water after the neutralizing step, removing a portion of the solvent mixture from the emulsion to provide a latex.

BRIEF DESCRIPTION OF DRAWINGS

Various embodiments of the present disclosure will be described herein below with reference to the figures wherein:

FIG. 1 shows a plot of particle size measured by Nanotrac for a hybrid styrene/acrylate-polyester resin-styrene acrylate latex in accordance with embodiments herein.

DETAILED DESCRIPTION

Embodiments herein provide methods to make polyester-styrene/acrylate (PE-St/Ac) hybrid latexes via phase inversion emulsification (PIE) processes. The methods can produce PE-St/Ac hybrid latex via PIE process directly in one pot. Further advantages of methods disclosed herein include (1) the hybrid latex particles can be generated via current PIE process with no major formula and facilities changes; (2) the subsequent aggregation/coalescence (NC) or continuous coalescence process (CCP) is greatly simplified because St/Ac was blended with polyester into individual latex particles at the start of the process; (3) incorporating lower cost St/Ac resin into polyester-based toners can further contribute to cost reduction.

In embodiments, any styrene/acrylate resin can be used to prepare hybrid latex via the proposed PIE process.

In particular embodiments, the polyester may be a graft polyester-styrene/acrylate copolymer and the St/Ac resin may be polystyrene/butyl acrylate. In embodiments, the St/Ac resin may be structure I:

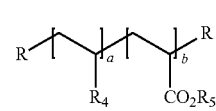

$R_4$ = aryl
$R_5$ = H, alkyl, alkenyl or aryl
R = Chain Initiating/Terminating Agent wherein a is an integer from 20 to 200 and b is an integer from 5 to 50.

In embodiments, the graft polyester-styrene acrylate is given by structure II:

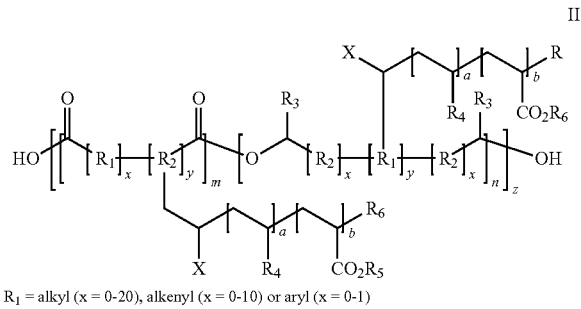

$R_1$ = alkyl (x = 0-20), alkenyl (x = 0-10) or aryl (x = 0-1)
$R_2$ = alkenyl (y = 0-10) or aryl (y = 0-1), $R_3$ = H or alkyl
X = $R_4$ or $CO_2R_5$, $R_6$ = $R_5$ or Polyester wherein each $R_1$ and $R_2$ is independent, a, b, $R_4$ and $R_5$ are defined as above and m is an integer from 10 to 50 and n is an integer from 10 to 50;

Hybrid structures are also accessible via graft formation as in polyester III:

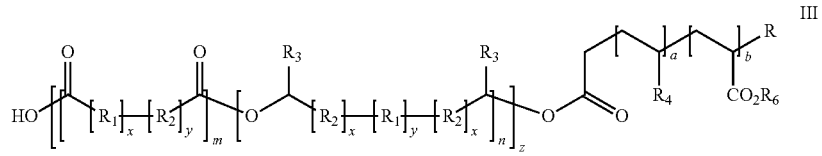

$R_1$ = alkyl (x = 0-20), alkenyl (x = 0-10) or aryl (x = 0-1)
$R_2$ = alkenyl (y = 0-10) or aryl (y = 0-1), $R_3$ = H or alkyl
X = $R_4$ or $CO_2R_5$, $R_6$ = $R_5$ or Polyester In embodiments, graft and block co-polyester-styrene acrylate of structures II and III are disclosed in U.S. Pat. No. 5,391,695; U.S. Pat. No. 5,483,016; U.S. Pat. No. 5,908,727; U.S. Pat. No. 6,984,601; U.S. Pat. No. 7,205,357; U.S. Pat. No. 7,387,863; U.S. Pat. No. 8,609,313 and U.S. Pat. No. 8,921,021. Hybrid styrene/acrylate (S/A) polyester resins can be made by addition polymerization of the vinyl containing monomers followed by polycondensation or by polycondensation to form the polyester backbone followed by addition polymerization to graft on the S/A portion of the final hybrid resin. In particular embodiments, addition polymerization is followed by polycondensation. In other embodiments, the processes used to make hybrid resins are exemplified by Examples 1 and 2 of U.S. Pat. No. 5,908,727 except that the addition of a waxy release during the polymerization is optional. In still other embodiments, at least one of the monomer is capable of participating both in addition polymerization and polycondensation. Examples of such dually reactive monomers include, but are not limited to, acrylic acid, methacrylic acid, maleic acid and fumaric acid. Other examples of dually reactive monomers are disclosed in U.S. Pat. No. 5,908,727. The weight ratio of monomers used to form polyester to the raw materials used to form the addition polymer is preferably 50/50 to 95/5, or 60/40 to 95/5 or 70/30 to 90/10 as is disclosed in U.S. Pat. No. 5,483,016, for example. The amount of dually reactive monomer can be about 0.5 to about 10% by weight or about 0.5 to about 5% by weight, based on the condensation polymerization type monomers used as starting material.

Without being bound by theory, it is postulated that the styrene/acrylate portion of the styrene/acrylate polyester hybrid resin may help to compatibilize the two resins. Thus, the two resins can be dissolved together in similar solvents such as methyl ethyl ketone (MEK) and/or isopropyl alcohol (IPA). Phase inversion can be initiated to incorporate the two resins directly into individual latex particles. Because both the graft polyester and regular styrene/acrylate polymer chains comprise styrene segments in their chemical structure, polymer chain entanglements during phase inversion help promote hybrid latex particles formation. In embodiments, such incorporation is substantially homogenous.

In some embodiments, processes disclosed herein may be integrated into a larger process or system for the production of toner particles. In some such embodiments, processes disclosed herein may further include mixing with sufficient heating the latex formed in the PIE process with one or more of a pigment, a wax, an aggregating agent, and a charge control agent to provide aggregated particles. These and other advantages will be appreciated by those skilled in the art.

In embodiments, there are provided phase inversion emulsification processes comprising dissolving a polyester resin and a styrene/acrylate resin in an organic solvent to provide a solution, neutralizing the solution with a neutralizing agent, forming an emulsion by adding water after the neutralizing step, and removing a portion of the organic solvent from the emulsion to provide a latex.

As used herein, a "polyester resin" includes any resin having an ester backbone and includes copolymers, homopolymers, terpolymers, grafted copolymers, and the like. In particular embodiments, the polyester resin is a grafted copolymer. In such embodiments, the graft is a styrene/acrylate, such as those commonly employed in the manufacture of a toner particle. In embodiments, the polyester resin is based on the graft hybrid resin as shown above. In embodiments, the polyester resin is any resin that includes a styrene acrylate graft within a polyester backbone. Such styrene acrylate grafts may incorporate any type of acrylate, including $C_1$-$C_6$ alkyl acrylates, $C_1$-$C_6$ alkyl methacrylates, acrylic acids, methacrylic acids, and the like.

As used herein, a "styrene/acrylate" polymer refers to a copolymer formed from styrene and an ester or free acid of acrylic or methacrylic acid. Esters include $C_1$-$C_8$ alkyl esters, which may be optionally substituted, for example, with one or more halogens. In embodiments, the second non-grafted resin is a styrene/acrylate selected to match the graft-styrene acrylate. In some embodiments, the styrene/acrylate is polystyrene/butyl acrylate.

In embodiments, the polyester resin further comprises a second polyester resin which can be selected to be amorphous or crystalline, as described herein further below.

In embodiments, the polyester resin and styrene/acrylate resin are present in a ratio from about 90:10 to about 80:20. In embodiments, the ratio may be outside this range, such as 95:5 or 75:25. Those skilled in the art will recognize that at higher ratios, there may be less cost savings benefit, but the resultant toner will still be operational.

In embodiments, the organic solvent is selected from the group consisting of isopropanol, methyl ethyl ketone, methanol, ethanol, 1-butanol, 2-butanol, isobutanol, tert-butanol, and combinations thereof.

In embodiments, the neutralizing agent is selected from the group consisting of ammonium hydroxide, potassium hydroxide, sodium hydroxide, sodium carbonate, sodium bicarbonate, lithium hydroxide, potassium carbonate, organoamines, and combinations thereof.

In embodiments, the dissolving step is performed at elevated temperature. For example, this may be near the boiling point of the selected solvent, such as MEK, IPA, and combinations thereof.

In embodiments, the removing step is performed under reduced pressure. That is under reduced pressure of a water aspirator, or less.

In embodiments, there are provided processes comprising dissolving a polyester resin and a styrene/acrylate resin in an organic solvent to provide a solution, neutralizing the solution with a neutralizing agent, forming an emulsion by adding water after the neutralizing step, removing a portion of the organic solvent from the emulsion to provide a latex, and mixing with sufficient heating the latex and one or more of a pigment, a wax, an aggregating agent, and a charge control agent to provide aggregated particles.

In embodiments, there are provided processes comprising dissolving a styrene/butylacrylate resin and an polyester-based resin graft resin above in a solvent mixture of methylethylketone (MEK) and isopropyl alcohol (IPA); to provide a solution, neutralizing the solution with a neutralizing agent, forming an emulsion by adding water after the neutralizing step, removing a portion of the solvent mixture from the emulsion to provide a latex.

In accordance with some embodiments, the following compositions are provided as guidance regarding the particular components that may be employed in the processes disclosed herein.

Resins

In some embodiments, one or more polyester resins may be employed. For example, the polyester resin may comprise a first amorphous polyester. In some embodiments, the polyester resin further comprises a second amorphous polyester. Polyester resins such as a poly(co-propoxylated bisphenol A co-ethoxylated bisphenol A co-terephthalate co-fumarate co-dodecenylsuccinate) and a branched amorphous polyester such as a poly(co-propoxylated bisphenol A co-ethoxylated bisphenol A co-terephthalate co-dodecenylsuccinate co-trimellitate) are commonly incorporated into Ultra-low-melt (ULM) toners, and these resins may account for about 75% to about 78% of the toner components. To make ULM toner, each resin is typically emulsified into an aqueous dispersion or emulsion (latex). Solvent-based phase inversion emulsification (PIE) processes disclosed herein can be employed to form the requisite polyester resin emulsions for making such toners with the inclusion of styrene acrylate as a third component.

In some embodiments, the first amorphous polyester and the second amorphous polyester may be present in a total amount in a range of from about 40% by weight to about 95% by weight of the latex.

In some embodiments, first amorphous polyester and second amorphous polyester are present in a ratio from about 0.1:0.9 to about 0.9:0.1, including any ratio in between.

In some embodiments, the polyester resin further comprises a crystalline polyester. In some embodiments, the crystalline polyester is present in an amount in a range of from about 1.0% by weight to about 35.0% by weight of the latex.

In some embodiments, the polyester resin comprises a crystalline resin, but not an amorphous resin.

Any polyester resin may be utilized in forming a latex emulsion of the present disclosure. In particular embodiments, the polyester resin is the graft polyester-based resin. In embodiments, the resins may be an amorphous resin, a crystalline resin, and/or a combination thereof. In embodiments, the resin may be a crystalline polyester resin with acidic groups having an acid number of about 1 mg KOH/g polymer to about 200 mg KOH/g polymer, in embodiments from about 5 mg KOH/g polymer to about 50 mg KOH/g polymer. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly (propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 1 to about 85 percent by weight of the toner components, in embodiments from about 5 to about 50 percent by weight of the toner components. The crystalline resin can possess various melting points of, for example, from about 30° C. to about 120° C., in embodiments from about 50° C. to about 90° C. The crystalline resin may have a number average molecular weight (Mn), as measured by gel permeation chromatography (GPC) of, for example, from about 1,000 to about 50,000, in embodiments from about 2,000 to about 25,000, and a weight average molecular weight (Mw) of, for example, from about 2,000 to about 100,000, in embodiments from about 3,000 to about 80,000, as determined by Gel Permeation Chromatography using polystyrene standards. The molecular weight distribution (Mw/Mn) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

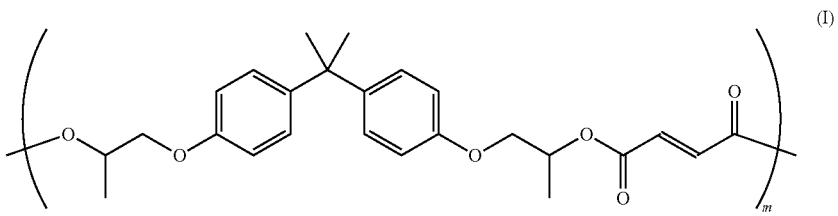

wherein m may be from about 5 to about 1000. Examples of such resins and processes for their production include those disclosed in U.S. Pat. No. 6,063,827, the disclosure of which is hereby incorporated by reference in its entirety.

In embodiments, a suitable polyester resin may be an amorphous polyester based on any combination of propoxylated bisphenol A, ethoxylated bisphenol A, terephthalic acid, fumaric acid, and dodecenyl succinic anhydride. Poly(co-propoxylated bisphenol A co-ethoxylated bisphenol A co-terephthalate co-fumarate co-dodecenylsuccinate), available from Kao Corporation, Japan, is an example of such an amorphous ester.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers of formula II:

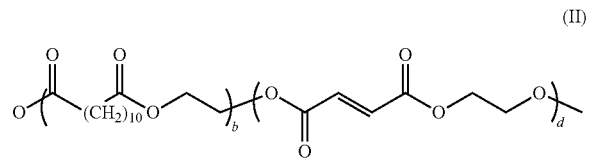

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

An amorphous resin may be present, for example, in an amount of from about 5 to about 95 percent by weight of the toner components, in embodiments from about 30 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the amorphous resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Solvent

In some embodiments, processes disclosed herein may employ an organic solvent is selected from the group consisting of isopropanol, methyl ethyl ketone, methanol, ethanol, 1-butanol, 2-butanol, isobutanol, tert-butanol, and combinations thereof. In particular embodiments, pair of organic solvents may be employed, at least one of which may have appreciable miscibility in water. Any suitable organic solvent may be used to dissolve the resin, for example, alcohols, esters, ethers, ketones, amines, and combinations thereof, in an amount of, for example, from about 0.1% by weight to about 100% by weight of the resin, in embodiments of from about 2% by weight to about 50% by weight of the resin, in other embodiments of from about 5% by weight to about 35% by weight of the resin.

In embodiments, the solvent to resin ratio may be about 0.1:10 to about 20:10, in other embodiments, from about 1.0:10 to about 5:10.

In embodiments, suitable organic solvents, sometimes referred to, in embodiments, as phase inversion agents, include, for example, methanol, ethanol, propanol, isopropanol, 1-butanol, 2-butanol, tert-butanol, ethyl acetate, methyl ethyl ketone, and combinations thereof. In embodiments, the organic solvent may be isopropanol. In embodiments, the organic solvent may be immiscible in water and may have a boiling point of from about 30° C. to about 150° C.

Neutralizing Agent

In embodiments, the resin may be mixed with a weak base or neutralizing agent. In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof, and the like. Suitable basic neutralizing agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2] octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

The basic neutralizing agent may be utilized in an amount of from about 0.001% by weight to 50% by weight of the resin, in embodiments from about 0.01% by weight to about 25% by weight of the resin, in embodiments from about 0.1% by weight to 5% by weight of the resin. In embodiments, the neutralizing agent may be added in the form of an aqueous solution. In other embodiments, the neutralizing agent may be added in the form of a solid.

Utilizing the above basic neutralizing agent in combination with a resin possessing acid groups, a neutralization ratio of from about 25% to about 500% may be achieved, in embodiments from about 50% to about 300%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent may thus raise the pH of an emulsion including a resin possessing acid groups from about 5 to about 12, in embodiments, from about 6 to about 11. The neutralization of the acid groups may, in embodiments, enhance formation of the emulsion.

Surfactants

In embodiments, the process of the present disclosure may optionally include adding a surfactant, before or during the dissolution, to the polyester resin. In embodiments, the surfactant may be added prior to dissolution of the polyester resin at an elevated temperature. Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, in embodiments, from about 0.1% to about 16% by weight of the resin, in other embodiments, from about 1% to about 14% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAXTm™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

Processing

As noted above, the present process may employ more than one polyester resin. In some such embodiments, the resins may be all pre-blended together prior to processing. In some embodiments, one of a mixture resins may be a crystalline resin and elevated temperatures may be employed in the process which may be a temperature above the crystallization temperature of the crystalline resin. In further embodiments, the resin may be a mixture of amorphous and crystalline resins and the temperature employed for dissolution may be above the glass transition temperature of the mixture.

In some embodiments emulsifying neutralized polyester resins may comprise adding water into the solution of neutralized resin until phase inversion occurs to form a phase inversed latex emulsion. Emulsification may be followed by distilling the latex to remove from it organic solvent, water or a mixture of the two.

In embodiments, the neutralizing agent which may be utilized in the process of the present disclosure includes the agents mentioned hereinabove. In embodiments, an optional surfactant employed in the process may be any of the surfactants to ensure that proper resin neutralization occurs and leads to a high quality latex with low coarse content.

In embodiments, the surfactant may be added to the one or more ingredients of the resin composition before, during, or after any mixing. In embodiments, the surfactant may be added before, during, or after the addition of the neutralizing agent. In embodiments, the surfactant may be added prior to the addition of the neutralizing agent. In embodiments, a surfactant may be added to a pre-blend mixture prior to dissolution.

In embodiments, a continuous phase inversed emulsion may be formed. Phase inversion can be accomplished by continuing to add an aqueous alkaline solution or basic agent, optional surfactant and/or water compositions to create a phase inversed emulsion which includes a disperse phase including droplets possessing the molten ingredients of the resin composition, and a continuous phase including a surfactant and/or water composition.

Stirring, although not necessary, may be utilized to enhance formation of the latex. Any suitable stirring device may be utilized. In embodiments, the stirring may be at a speed of from about 10 revolutions per minute (rpm) to about 5,000 rpm, in embodiments from about 20 rpm to about 2,000 rpm, in other embodiments from about 50 rpm to about 1,000 rpm. The stirring need not be at a constant speed, but may be varied. For example, as the mixture becomes more uniform, the stirring rate may be increased. In embodiments, a homogenizer (that is, a high shear device), may be utilized to form the phase inversed emulsion, but in other embodiments, the process of the present disclosure may take place without the use of a homogenizer. Where utilized, a homogenizer may operate at a rate of from about 3,000 rpm to about 10,000 rpm.

Although the point of phase inversion may vary depending on the components of the emulsion, any temperature of heating, the stirring speed, and the like, phase inversion may occur when the basic neutralization agent, optional surfactant, and/or water has been added so that the resulting resin is present in an amount from about 5% by weight to about 70% by weight of the emulsion, in embodiments from about 20% by weight to about 65% by weight of the emulsion, in other embodiments from about 30% by weight to about 60% by weight of the emulsion.

Following phase inversion, additional surfactant, water, and/or aqueous alkaline solution may optionally be added to dilute the phase inversed emulsion, although this is not required. Following phase inversion, the phase inversed emulsion may be cooled to room temperature if heat was employed, for example from about 20° C. to about 25° C.

In embodiments, distillation may be performed to provide resin emulsion particles as a latex with an average diameter size of, for example, from about 50 nm to about 500 nm, in embodiments from about 120 nm to about 250 nm. In some embodiments, the distillate may be optionally recycled for use in a subsequent phase inversion emulsification process.

In embodiments, for example, the distillate from the process of the present disclosure may contain methyl ethyl ketone (MEK), isopropanol (IPA) and water. In embodiments, the MEK-IPA-water mixture may be re-used for the next phase inversion batch. In some embodiments, solvents may be removed by a vacuum distillation.

The emulsified polyester resin particles in the aqueous medium may have a submicron size, for example of about 1 µm or less, in embodiments about 500 nm or less, such as from about 10 nm to about 500 nm, in embodiments from about 50 nm to about 400 nm, in other embodiments from about 100 nm to about 300 nm, in some embodiments about 200 nm. Adjustments in particle size can be made by modifying the ratio of solvent to resin, the neutralization ratio, solvent concentration, and solvent composition.

Particle size distribution of a latex of the present disclosure may be from about 30 nm to about 500 nm, in embodiments, from about 125 nm to about 400 nm.

The coarse content of the latex of the present disclosure may be from about 0.01% by weight to about 5% by weight, in embodiments, from about 0.1% by weight to about 3% by weight. The solids content of the latex of the present disclosure may be from about 10% by weight to about 50% by weight, in embodiments, from about 20% by weight to about 45% by weight.

The process of the present disclosure for the production of polyester emulsions using PIE may eliminate or minimize wasted product and produces particles with more efficient solvent stripping, solvent recovery, and permits recycling of the solvent.

The emulsions of the present disclosure may then be utilized to produce particles that are suitable for formation of toner particles.

Toner

Once the polyester resin has been converted into a latex and it may be utilized to form a toner by any process within the purview of those skilled in the art. The latex may be contacted with a colorant, optionally in a dispersion, and other additives to form an ultra low melt toner by a suitable process, in embodiments, an emulsion aggregation and coalescence process.

In embodiments, the optional additional ingredients of a toner composition including colorant, wax, and other additives, may be added before, during or after mixing the resin to form the emulsion. The additional ingredients may be added before, during or after formation of the latex emulsion. In further embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. In embodiments, the colorant may be included in the toner in an amount of, for example, about 0.1 to about 35% by weight of the toner, or from about 1 to about 15% by weight of the toner, or from about 3 to about 10% by weight of the toner, although the amount of colorant can be outside of these ranges.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

In general, suitable colorants may include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann of Canada), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871 K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991 K (BASF), Paliotol Yellow 1840 (BASF), Novaperm Yellow FGL (Hoechst), Permanerit Yellow YE 0305 (Paul Uhlrich), Lumogen Yellow D0790 (BASF), Sunsperse Yellow YHD 6001 (Sun Chemicals), Suco-Gelb 1250 (BASF), Suco-Yellow D1355 (BASF), Suco Fast Yellow D1165, D1355 and D1351 (BASF), Hostaperm Pink E™ (Hoechst), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing, and the like.

Other suitable water based colorant dispersions include those commercially available from Clariant, for example, Hostafine Yellow GR, Hostafine Black T and Black TS, Hostafine Blue B2G, Hostafine Rubine F6B and magenta dry pigment such as Toner Magenta 6BVP2213 and Toner Magenta E02 which may be dispersed in water and/or surfactant prior to use.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600X and GHD 6004X (Pigment Green 7 74260), Sunsperse QHD 6040X (Pigment Red 122 73915), Sunsperse RHD 9668X (Pigment Red 185 12516), Sunsperse RHD 9365X and 9504X (Pigment Red 57 15850: 1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water based pigment dispersions from Sun Chemicals, Heliogen Blue L6900™, D6840™, D7080™, D7020™, Pylam Oil Blue™, Pylam Oil Yellow™, Pigment Blue 1™ available from Paul Uhlich & Company, Inc., Pigment Violet 1™, Pigment Red 48™, Lemon Chrome Yellow DCC 1026™, E.D. Toluidine Red™ and Bon Red C™ available from Dominion Color Corporation, Ltd., Toronto, Ontario, Novaperm Yellow FGL™, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

In embodiments, a pigment or colorant may be employed in an amount of from about 1% by weight to about 35% by weight of the toner particles on a solids basis, in other embodiments, from about 5% by weight to about 25% by weight. However, amounts outside these ranges can also be used, in embodiments.

Wax

Optionally, a wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the toner particles, in embodiments from about 5% by weight to about 20% by weight of the toner particles, although the amount of wax can be outside of these ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 300 nm.

Toner Preparation

The toner particles may be prepared by any process within the purview of one skilled in the art. Although embodiments relating to toner particle production are described below with respect to emulsion aggregation processes, any suitable process of preparing toner particles may be used, including chemical processes, such as suspension and encapsulation processes disclosed in U.S. Pat. Nos. 5,290,654 and 5,302, 486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional colorant, an optional wax and any other desired or required additives, and emulsions including the polyester resins described above, optionally in surfactants, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkyl zinc, dialkyl zinc, zinc oxides, stannous oxide, dibutyltin oxide, dibutyltin oxide hydroxide, tetraalkyl tin, combinations thereof, and the like. Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0% to about 10% by weight, in embodiments from about 0.2% to about 8% by weight, in other embodiments from about 0.5% to about 5% by weight, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining sufficient temperature, or slowly raising the temperature to, for example, from about 40° C. to about 100° C., and holding the mixture at this temperature for a time of from about 0.5 hours to about 6 hours, in embodiments from about hour 1 to about 5 hours, while maintaining stirring, to provide the aggregated particles. Once the predetermined desired particle size is reached, then the shell resin latex is added.

Shell Resin

In embodiments, after aggregation, but prior to coalescence, a resin coating may be applied to the aggregated particles to form a shell thereover. In embodiments, the core may thus include a crystalline resin, as described above. Any resin described above may be utilized as the shell. In embodiments, a polyester amorphous resin latex as described above may be included in the shell. In embodiments, the polyester amorphous resin latex described above may be combined with a different resin, and then added to the particles as a resin coating to form a shell.

In embodiments, resins which may be utilized to form a shell include, but are not limited to, a crystalline resin latex described above, and/or the amorphous resins described above. In embodiments, an amorphous resin which may be utilized to form a shell in accordance with the present disclosure includes an amorphous polyester, optionally in combination with a crystalline polyester resin latex described above. Multiple resins may be utilized in any suitable amounts. In embodiments, a first amorphous polyester resin, for example an amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments, a second resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any process within the purview of those skilled in the art. In embodiments, the resins utilized to form the shell may be in an emulsion including any surfactant described above. The emulsion possessing the resins, optionally the crystalline polyester resin latex described above, may be combined with the aggregated particles described above so that the shell forms over the aggregated particles.

The formation of the shell over the aggregated particles may occur while heating to a temperature of from about 30° C. to about 80° C., in embodiments from about 35° C. to about 70° C. The formation of the shell may take place for a period of time of from about 5 minutes to about 10 hours, in embodiments from about 10 minutes to about 5 hours.

The shell may be present in an amount of from about 1 percent by weight to about 80 percent by weight of the latex particles, in embodiments of from about 10 percent by weight to about 40 percent by weight of the latex particles, in still further embodiments from about 20 percent by weight to about 35 percent by weight of the latex particles.

Once the desired final size of the toner particles is achieved, the pH of the mixture may be adjusted with a base to a value of from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

In embodiments, the final size of the toner particles may be of from about 2 µm to about 12 µm, in embodiments of from about 3 µm to about 10 µm.

Coalescence

Following aggregation to the desired particle size and application of any optional shell, the particles may then be coalesced to the desired final shape, the coalescence being achieved by, for example, heating the mixture to a temperature of from about 45 C to about 150 C, in embodiments from about 55° C. to about 99° C., which may be at or above the glass transition temperature of the resins utilized to form the toner particles, and/or reducing the stirring, for example to from about 20 rpm to about 1000 rpm, in embodiments from about 30 rpm to about 800 rpm. Coalescence may be accomplished over a period of from about 0.01 to about 9 hours, in embodiments from about 0.1 to about 4 hours.

After aggregation and/or coalescence, the mixture may be cooled to room temperature, such as from about 20 C to about 25 C. The cooling may be rapid or slow, as desired. A suitable cooling process may include introducing cold water to a jacket around the reactor. After cooling, the toner particles may be optionally washed with water, and then dried. Drying may be accomplished by any suitable process for drying including, for example, freeze-drying.

Additives

In embodiments, the toner particles may also contain other optional additives, as desired or required. For example, the toner may include positive or negative charge control agents, for example in an amount of from about 0.1 to about 10% by weight of the toner, in embodiments from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, tribo enhancement, admix control, improved development and transfer stability, and higher toner blocking temperature. TiO2 may be applied for improved relative humidity (RH) stability, tribo control and improved development and transfer stability. Zinc stearate, calcium stearate and/or magnesium stearate may optionally also be used as an external additive for providing lubricating properties, developer conductivity, tribo enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount of from about 0.1% by weight to about 5% by weight of the toner, in embodiments of from about 0.25% by weight to about 3% by weight of the toner, although the amount of additives can be outside of these ranges. In embodiments, the toners may include, for example, from about 0.1% by weight to about 5% by weight titania, from about 0.1% by weight to about 8% by weight silica, and from about 0.1% by weight to about 4% by weight zinc stearate.

Suitable additives include those disclosed in U.S. Pat. Nos. 3,590,000, 3,800,588, and 6,214,507, the disclosures of each of which are hereby incorporated by reference in their entirety.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This example describes the preparation and characterization of a hybrid latex in accordance with embodiments herein.

Preparation of St/Ac-Polyester Hybrid Latex

Table 1 lists the formulation used in forming a PIE hybrid latex. 20 g polystyrene-butyl acrylate (St/Ac) resin and 180 g graft hybrid polyester-styrene/acrylate resin (available from KAO Corporation) were added. 20 g St/Ac resin was first added and dissolved in the solvent mixer (160 g MEK and 36 g IPA) for 20 minutes with aggressive mixing, followed by addition of 125 g water. Then, 180 g graft hybrid polyester resin was added into the mixer to form the styrene/acrylate-polyester solution. After the neutralization of dissolved resins, 275 g water was slowly added to convert the resin solution into latex at 40° C. under aggressive agitation.

TABLE 1

| Chemicals | Parts | Percentage (%) | Quantity (g) |
|---|---|---|---|
| hybrid polyester resin* | 9.00 | 23.4 | 180 |
| St/Ac Resin | 1.00 | 2.63 | 20 |
| Methyl Ethyl Ketone | 8.00 | 15.62 | 120 |
| Isopropyl Alcohol | 1.8 | 4.69 | 36 |
| Aqueous Ammonia (I) | 0.208 | 0.54 | 4.16 |
| D I water (I) | 6.25 | 16.27 | 125 |
| Aqueous Ammonia (II) | 0.418 | 1.09 | 8.36 |
| D I water (II) | 13.74 | 35.77 | 275 |
| Total | 38.42 | 100 | 768.3 |

*Commerical hybrid resin had an acid value 24.3. Neutralization ratio of this resin in this experiment was 85%.

Particle Size Analysis

Table 2 lists the particle sizes for this hybrid latex, and FIGURE a shows the particle size Nanotrac results. The particle size distributions of the latex indicate successful formation of single latex particles. The neutralization ratio of the PIE formula may be altered, as desired to lower the particle size and provide a narrower particle size distribution. Also, higher concentration of St/Ac may be incorporated as desired.

TABLE 2

Particle sizes of St/Ac-Polyester Hybrid Latex.

| MV (nm) | D50 (nm) |
|---|---|
| 254.3 | 241.8 |

What is claimed is:

1. A phase inversion emulsification process comprising:
    dissolving a polyester resin and a styrene/acrylate resin in an organic solvent to provide a solution;
    neutralizing the solution with a neutralizing agent;
    forming an emulsion by adding water after the neutralizing step; and
    removing a portion of the organic solvent from the emulsion to provide a latex.

2. The process of claim 1, wherein the polyester resin is based on a graft styrene/acrylate-polyester.

3. The process of claim 1, wherein the styrene/acrylate is polystyrene/butyl acrylate.

4. The process of claim 1, wherein the polyester resin further comprises a second polyester which can be selected to be amorphous or crystalline.

5. The process of claim 1, wherein the polyester resin and styrene/acrylate resin are present in a ratio from about 90:10 to about 80:20.

6. The process of claim 1, wherein the organic solvent is selected from the group consisting of isopropanol, methyl ethyl ketone, methanol, ethanol, 1-butanol, 2-butanol, isobutanol, tert-butanol, and combinations thereof.

7. The process of claim 1, wherein the neutralizing agent is selected from the group consisting of ammonium hydroxide, potassium hydroxide, sodium hydroxide, sodium carbonate, sodium bicarbonate, lithium hydroxide, potassium carbonate, organoamines, and combinations thereof.

8. The process of claim 1, wherein the dissolving step is performed at elevated temperature.

9. The process of claim 1, wherein the removing step is performed under reduced pressure.

10. A process comprising:
    dissolving a polyester resin and a styrene/acrylate resin in an organic solvent to provide a solution;
    neutralizing the solution with a neutralizing agent;
    forming an emulsion by adding water after the neutralizing step;
    removing a portion of the organic solvent from the emulsion to provide a latex; and
    mixing with sufficient heating the latex and one or more of a pigment, a wax, an aggregating agent, and a charge control agent to provide aggregated particles.

11. The process of claim 10, further comprising adding a second latex to the aggregated particles and heating to form a toner particle comprising a shell of the second latex.

12. The process of claim 10, wherein the polyester resin is based on a graft styrene/acrylate-polyester.

13. The process of claim 10, wherein the styrene/acrylate is polystyrene/butyl acrylate.

14. The process of claim 10, wherein the polyester resin further comprises a second polyester which can be selected to be amorphous or crystalline.

15. The process of claim 10, wherein the polyester resin and styrene/acrylate resin are present in a ratio from about 90:10 to about 80:20.

16. The process of claim 10, wherein the organic solvent is selected from the group consisting of isopropanol, methyl ethyl ketone, methanol, ethanol, 1-butanol, 2-butanol, isobutanol, tert-butanol, and combinations thereof.

17. The process of claim 10, wherein the neutralizing agent is selected from the group consisting of ammonium hydroxide, potassium hydroxide, sodium hydroxide, sodium carbonate, sodium bicarbonate, lithium hydroxide, potassium carbonate, organoamines, and combinations thereof.

18. The process of claim 10, wherein the dissolving step is performed at elevated temperature.

19. The process of claim 10, wherein the removing step is performed under reduced pressure.

20. A process comprising:
    dissolving a styrene/butylacrylate resin and a graft styrene/acrylate-polyester in a solvent mixture of methylethylketone (MEK) and isopropyl alcohol (IPA); to provide a solution;
    neutralizing the solution with a neutralizing agent;
    forming an emulsion by adding water after the neutralizing step;
    removing a portion of the solvent mixture from the emulsion to provide a latex.

* * * * *